(12) United States Patent
Pacholik et al.

(10) Patent No.: US 6,821,404 B1
(45) Date of Patent: Nov. 23, 2004

(54) COPPER RECOVERY PROCESS

(75) Inventors: Robert Pacholik, Askim (SE); Gunnar Lidmer, Vallda (SE)

(73) Assignee: Mercer Holdings Corp., Askim (SE)

( * ) Notice: Subject to any disclaimer, the term of this patent is extended or adjusted under 35 U.S.C. 154(b) by 0 days.

(21) Appl. No.: 09/913,938

(22) PCT Filed: Jan. 14, 2000

(86) PCT No.: PCT/SE00/00066

§ 371 (c)(1),
(2), (4) Date: Oct. 2, 2001

(30) Foreign Application Priority Data

Mar. 2, 1999 (SE) .............................................. 9900748

(51) Int. Cl.[7] .............................................. C25D 5/02
(52) U.S. Cl. ........................ 205/125; 205/584; 205/586
(58) Field of Search ................................ 205/125, 584, 205/586

(56) References Cited

U.S. PATENT DOCUMENTS

| | | |
|---|---|---|
| 4,083,758 A | 4/1978 | Hamby et al. |
| 4,252,621 A * | 2/1981 | Reinhardt et al. .......... 205/581 |
| 5,261,154 A | 11/1993 | Ferrier et al. |
| 5,705,048 A * | 1/1998 | Oxley et al. ................. 205/345 |
| 6,071,398 A * | 6/2000 | Martin et al. ................ 205/103 |

FOREIGN PATENT DOCUMENTS

| | | |
|---|---|---|
| DE | 195 06 832 A2 | 8/1996 |
| EP | 0 005 415 A1 | 11/1979 |

OTHER PUBLICATIONS

P. Leisner et al. "Throwing Poswer and Ductility of Pulse Reversal Plated Copper for PCBs," *Processing of Advanced Materials* (1994) 9, pp. 143–154.

* cited by examiner

*Primary Examiner*—Melvyn Andrews
(74) *Attorney, Agent, or Firm*—Burns, Doane, Swecker & Mathis, L.L.P.

(57) ABSTRACT

A process for recovering copper from an alkaline etch bath from an etching process in which printed boards plated with copper are etched with the alkaline etch bath and then rinsed with water, copper being removed by extraction with an organic solution, from which it is re-extracted in an acid solution. Said acid solution is passed to an operation for recovering copper, e.g. by electrolysis, but before said copper recovery a flow is diverted, in which the copper content is adjusted to a value below the value of the acid solution for copper recovery and which is used for the plating of printed boards.

43 Claims, 2 Drawing Sheets

COPPER RECOVERY PROCESS

TECHNICAL FIELD

Figure 1:
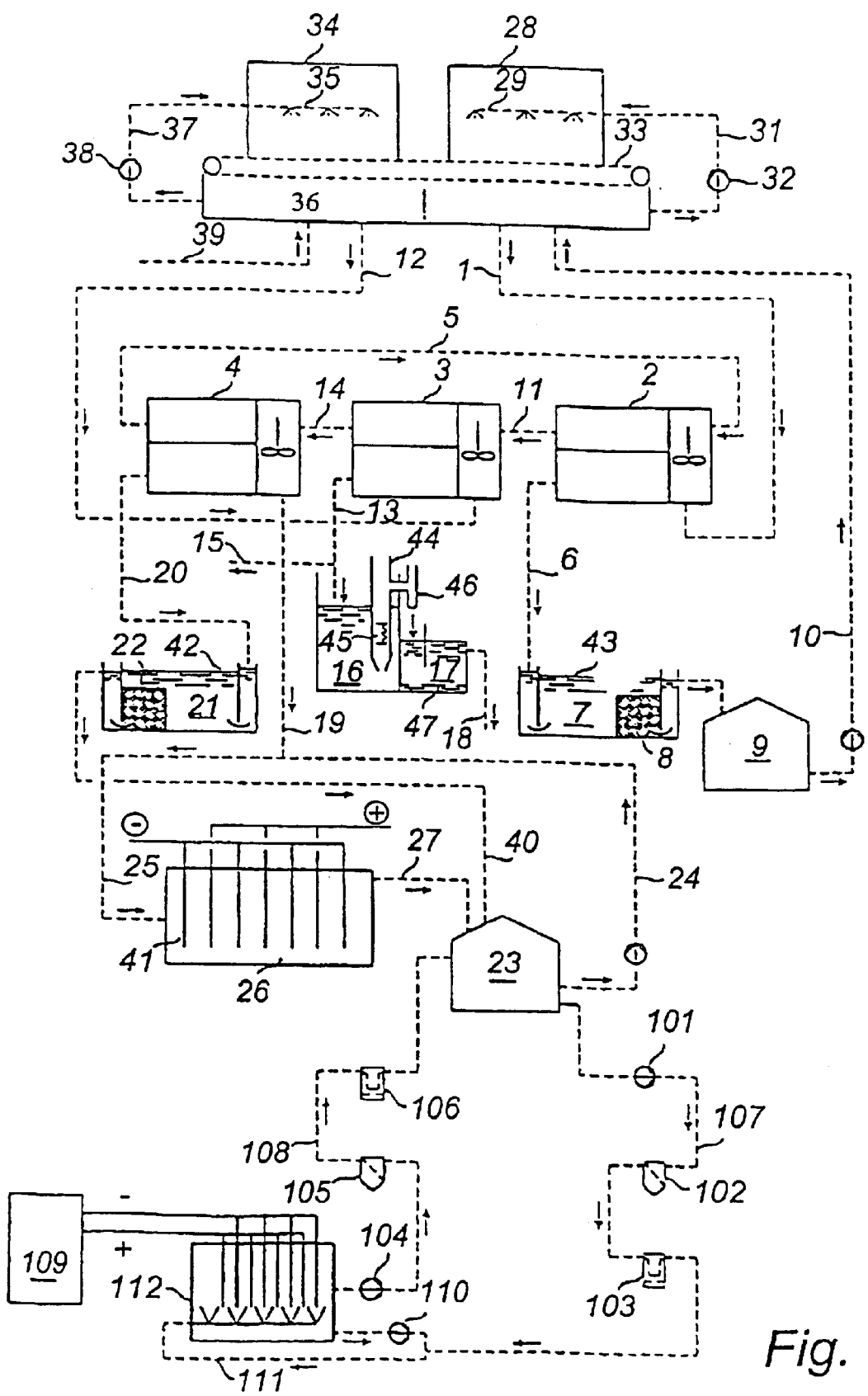

The present invention relates to the technical field of recovering an etch bath from an etching process in which printed boards coated with copper are etched with the alkaline etch bath and then rinsed with water. The recovery of copper from such an etch bath as well as the recovery of the etch bath itself are known per se, but the invention relates to the recovery of copper in a manner that is completely new in this connection and very advantageous.

BACKGROUND OF THE INVENTION

Today, electronics are primarily composed of components which are soldered onto printed boards. The manufacture of these printed boards has increased rapidly. Advanced electronics, such as computers, require very complicated printed boards and the manufacture thereof has resulted in the emergeing of a special industry.

A printed board consists of a plate made of a base material, which is often a plastic material, e.g. epoxy. This plate is coated with a thin (e.g. about 15–20 µm) copper layer on both sides.

The manufacture of these printed boards may, for instance, be carried out in the following manner. According to a predetermined pattern, holes of different size are drilled into the plates so that ducts are formed between the two sides and so that holes are formed, in which components can be mounted. After that, all surfaces are coated with a copper layer which has a thickness of about 2–4 µm and which is applied in a chemical manner instead of electrochemically. This is necessary since the walls of the holes consist of a material (e.g. epoxy) on which it is not possible to use electrochemical plating. As a result, an integral and continuous copper surface is obtained, which can subsequently be coated by means of electrochemical plating.

The next step in the manufacture of printed boards is to make the desired conductive pattern. To this end, the surfaces which are to be free from copper are coated with a non-conductive protective film, and the boards are fed into a so-called electroplating line. This line comprises a number of different baths, into which the boards are dipped.

In one of these baths, the exposed copper surfaces are coated with additional copper to provide the desired thickness of conductors, after which the same surfaces are coated with a tin layer, which will serve as a protection during the subsequent etching.

After that, the etching of the printed boards in question takes places, which is usually carried out by means of alkaline solutions. Preferably, they are ammoniacal and contain free ammonia as well as one or more ammonium salts (e.g. $NH_4Cl$, $NH_4HCO_3$). When etching, copper is removed from the surfaces of the printed board, on which the copper layer is exposed to the solution. Gradually, the copper content of the bath rises to a level, on which the speed of etching drastically decreases and the bath is no longer usable. Usually, the upper limit of the copper content is about 150–170 g/l, depending on the composition of the bath. After the etching, the printed boards are rinsed with water to be clean.

The boards are then passed on to be stripped of tin and coated with varnish, wax, etc.

A method for regenerating the etch bath in & process of this kind is known from EP-B1-0005415. This method may be directly connected to the etching process and it involves in short the regeneration of the etch bath for renewed use in an etching process, copper being removed from the etch bath by extraction. The method also allows treatment of the rinsing water so that it may subsequently be let out in an environmentally suitable manner.

The copper which is extracted from the etch bath and preferably also from the rinsing water is recovered as metallic copper by electrolysis.

DESCRIPTION OF THE INVENTION

The present invention relates to a new and, in this connection, extremely advantageous process for recovering copper from an alkaline etch bath of the above-mentioned kind. According to the invention, it has thus surprisingly been found that it is possible not only to recover copper from the etch bath and preferably also from the rinsing water in an alternative new manner but also to reuse recovered copper-in the plating process. Generally, the process according to the invention makes it possible to directly reuse a copper-containing solution which is obtained after the extraction from the alkaline etch bath in the plating of the printed boards, if a flow is diverted from the copper-containing acid solution which is obtained from the re-extraction step and the balance of the copper content is adjusted between this flow and the acid solution which is withdrawn for recovering copper, e.g. metallic copper by electrolysis. As a result, the need for cost-demanding electrolysis for recovering metallic copper is reduced, at the same time as the need for additives of expensive anode copper is reduced or eliminated in the plating. In addition, it is possible to directly and in the same place use the recovered copper which previously could only be sold at a price of about ¼ of the price of said anode copper while achieving a plating quality which is at least equally good or even better than the quality obtained in plating according to the plating technique which was previously commercially used.

Moreover, one condition of successful plating, i.e. with a satisfactory evenness of surface and satisfactory coating in holes and the like, in connection with commercial methods previously used for electroplating has been the addition of a number of different chemicals. Besides the fact that these chemicals to a certain extent have not been compatible with reagents which are used in the extraction, and therefore must be removed according to prior-art technique, which has complicated the process and made it more expensive, it has thus been found that the use of these chemicals may be reduced or completely eliminated in the process according to the present invention, if the plating is carried out under special conditions, in particular pulse plating. According to the invention, it has thus been found that at least equally good results as according to prior-art technique may be achieved by this new method according to the invention, which results in considerable advantages in terms of both costs and environment. Besides the fact that the process is simpler and cheaper, the process according to the invention also allows a completely closed or continuous process, in which also the plating step may be included in the prior-art etching and recovery process.

Further advantages of the invention will appear from the description below.

In this connection, it can be added that pulse plating of printed boards is known per se from Processing of Advanced Materials (1994) 9, pp 148–154, but this publication does not in any way disclose or even suggest that such plating could be integrated in a process of the kind involved in the present invention and even less so under the same circumstances and with the same results as in the case of the present invention.

Thus, the process according to the invention is a process for recovering copper from an alkaline, preferably ammoniacal, etch bath from an etching process in which printed boards electroplated with copper are etched with the alkaline etch bath and then rinsed with water, a part of the copper content of the alkaline etch bath being removed by extraction with an organic solution containing a reagent, which forms with copper a complex compound, which is extracted by the organic solution, the alkaline etch bath being recirculated to renewed etching, the copper-containing organic solution being contacted, in a re-extraction step, with an aqueous solution of acid, preferably sulphuric acid, so that copper passes from the organic solution to the aqueous solution, and the organic solution being recirculated from the re-extraction step to renewed extraction. The process according to the invention is characterised by the steps of passing the copper-containing acid solution obtained from the re-extraction step to a copper recovery operation, preferably for producing metallic copper by electrolysis, diverting a flow from the copper-containing acid solution before the operation for recovering copper from the same and adjusting the copper content of said flow so that it will be lower than the copper content of the acid solution which is used in the copper recovery operation, and re-circulating said flow having an adjusted copper content to the operation for electroplating printed boards for use therein.

According to a preferred embodiment of the process. copper is also removed from the rinsing water from the etching process by extraction with an organic solution containing a reagent, which forms with copper a complex compound which is extracted by the organic solution.

One embodiment of the last-mentioned process involves using the same organic solution for the rinsing water as for the alkaline etch bath and first removing copper from the alkaline etch bath, then contacting the thus obtained copper-containing organic solution with the rinsing water and subsequently subjecting the organic solution to said re-extraction.

Another embodiment of said process involves using the same organic solution for the rinsing water as for the alkaline etch bath and first removing copper from the rinsing water, then contacting the thus obtained copper-containing organic solution with the alkaline etch bath and subsequently subjecting the organic solution to said re-extraction.

A particularly preferred embodiment of the process according to the invention implies that it is carried out as a closed process, in which the plated printed board is etched with said alkaline etch bath and the acid solution from the plating is used for said re-extraction step. Most preferably, also the acid solution from the copper recovery operation is recirculated to the re-extraction step or steps.

According to the invention, it has been found that excellent results are achieved if the flow is adjusted so that the ratio of copper consent of said flow:copper content of said acid solution is >0.3:1, preferably >0.5:1. According to a particularly preferred embodiment of the process according to the invention, the flow is adjusted so that said ratio is in the range of 0.60:1–0.95:1, most preferably 0.75:1–0.95:1.

As suggested above, a particularly advantageous embodiment of the process implies that the plating is carried out in the form of pulse plating. In this connection, pulse plating refers to plating with pole reversal and/or pulses varying for current intensity. This can be achieved with suitable rectifier equipment. The varying pulses and/or the pole reversal may be regularly or irregularly wave-shaped, suitably square. As concerns this technique as such, information may be retrieved from the above-mentioned publication on pulse plating in general, but according to the invention it has been found that advantageous results are achieved under special conditions.

These conditions may be summarised as follows.

The pulse plating is preferably carried out with a pulse length of the wave-shaped pulses in the range of 1–500 ms, preferably 10–50 ms. In the case of these pulses, it is possible to have pulse lengths varying within the indicated ranges or use substantially the same, or exactly the same, pulse length for pulse peaks as for pulse bases, i.e. the period of time during which the wave-shaped, preferably square, pulses have maximum and minimum current intensity, respectively, alternatively maximum current intensity for +–voltage and –voltage, respectively.

Preferably, the period of time during which the printed board acts as cathode in the pulse plating is adjusted to a value in the range of 1–200 s, in particular 10–100 s.

The period of time during which the printed board acts as anode in the pulse plating is preferably adjusted to a value in the range of 0.1–20 s, in particular 1–10 s.

The maximum current intensity during the period of time when the printed board acts as cathode in the pulse plating is suitably 10 $A/dm^2$, preferably 5 $A/dm^2$ and most preferably 3 $A/dm^2$.

The maximum current intensity during the period of time when the printed board acts as anode in the pulse plating is preferably 40 $A/dm^2$, more preferably 10 $A/dm^2$ and most preferably 5 $A/dm^2$.

Generally, the average current intensity when the printed board acts as anode is greater than the average current intensity when the printed board acts as cathode.

According to the invention, it has furthermore been found that excellent results are achieved if the copper content of the flow which is recirculated to the plating is adjusted to a value in the range of 5–100 g/l, preferably 10–50 g/l, more preferably 15–30 g/l and most preferably 20–25 g/l.

In the case of such an adjustment, it has been found that an adjustment of the copper content of the flow which is recirculated to the plating functions extremely well by the addition of acid from the re-extraction step. As a rule, it is preferably the same order of magnitude of the copper content of the acid solution which is used in the copper recovery operation, use being made, however, of the important inventive adjustment of the ratio of the copper content of said flow to the copper content of said acid solution. The copper recovery operation is suitably, but not necessarily, an operation for recovering metallic copper by electrolysis. Details about this type of electrolysis as such can be retrieved from prior-art technique.

Generally, the acid content, or the content of anion from the acid which is used in the re-extraction and which is preferably sulphate, when the preferred acid is sulphuric acid, is adjusted to a value in the range of 25–500 g/l, preferably 50–200 g/l. This is the case of both the acid solution for the copper recovery operation and the flow for the plating, which moreover suitably have substantially, or exactly, the same acid content.

Another variant of the process according to the invention is represented by the case in which the polarity of the plating is reversed after the plating of copper, so that previously plated copper can be used as a buffer store of copper if the amount of copper obtained from the extraction is less than the amount required for the plating.

Another great advantage of the invention is, as already suggested above, that the new process according to the invention allows pulse plating without any additives of the type previously used in non-pulse plating of printed boards. Besides the fact that this, of course, involves great economic gains, it has also contributed to making it possible to integrate the plating in the described advantageous manner in a copper recovery process of the defined type.

Among other factors having an influence on the plating, mention can be made of the content of alkaline substance originating from the etch bath and the content of organic material originating from the extraction. According to the invention, it has thus been found that excellent results may be achieved in the process according to the invention if the content of said alkaline substance and/or the content of said organic material in the flow recirculated to the pulse plating is reduced, and preferably eliminated, before plating.

This reduction or these reductions may be carried out at different stages in the process according to the invention, but a particularly preferred embodiment is represented by the case where the reduction(-s) in question is/are carried out by means of one or more separate water washing steps in connection with the equipment which is used for the extraction. Such water washing steps are preferably integrated before the last step of the extraction process.

The reduction(-s) in question may also be carried out by means of one or more filters, preferably filters of charcoal and/or ultrafilter type. Such filters may also be placed at various locations in the process, but they are advantageously positioned in the separate loop which is represented by the flow which is recirculated to the plating.

Another advantageous embodiment of the process according to the invention is represented by the case in which colloidal copper is removed before the plating, preferably by means of one or more filters, in particular ultrafilters, from the flow which is recirculated to the pulse plating.

As will be described in more detail below in connection with the embodiments shown in the drawings, mixer-settler devices have been used in prior-art extraction. According to the invention, it has, however, been found that particularly favourable results in the plating may be achieved if these mixer-settler devices are wholly or partly replaced by one or more extractors. Such extractors are, of course, known per se, but they have been found to yield advantageous results in connection with the invention. By extractor is essentially meant a device in which the above-mentioned settler in the mixer-settler device is replaced by a centrifuge or some other separation means to which energy is supplied from the outside, whereas a settler is essentially based on the use of the force of gravity.

DRAWINGS

Figure 2:
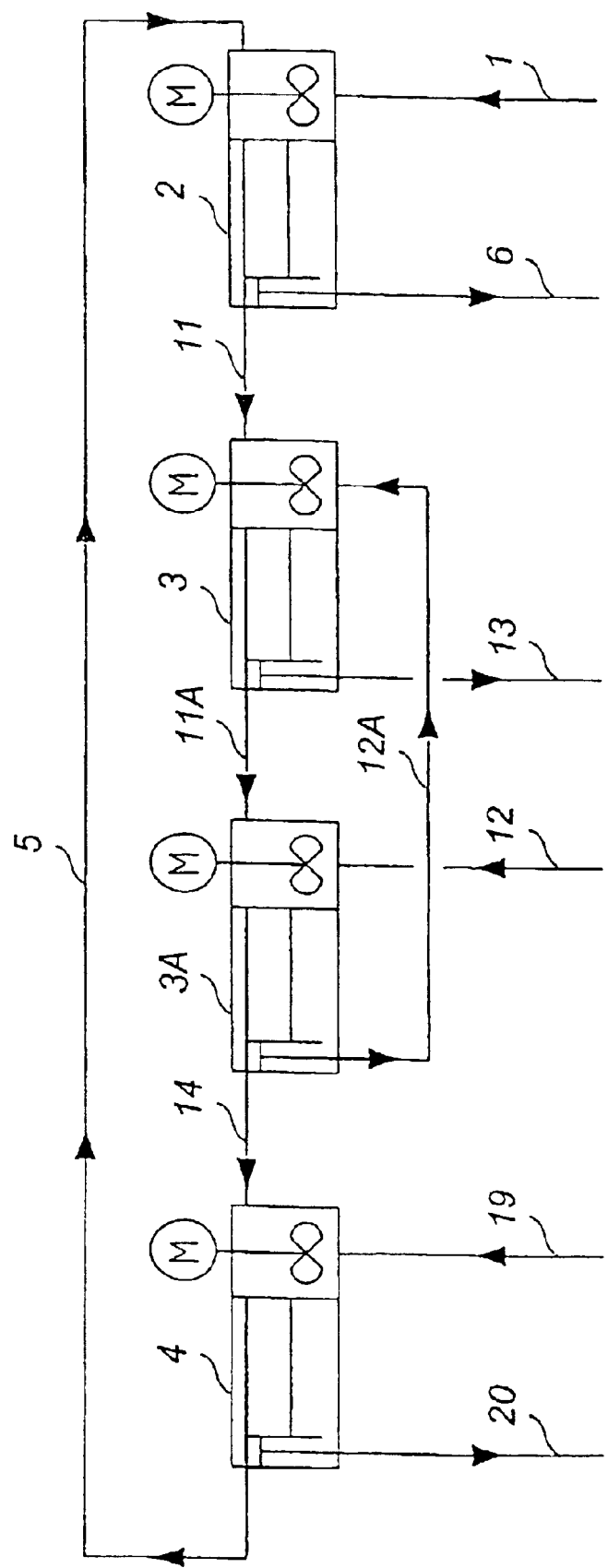

FIG. 1 schematically shows an embodiment of the process according to the invention, and FIG. 2 schematically shows an alternative embodiment of the mixer-settler installation which is included in the installation shown in FIG. 1.

The components which are comprised in the installation shown in FIG. 1 as well as their functions can be summarised as follows.

The boards which are to be etched are conveyed on a conveyor 33 through an etching chamber 2B and then through a washing chamber 34. Etching solution is pumped by means of a pump 32 from a container 30 via a conduit 31 to a perforated pipe 29 inside the etching chamber 28 and is sprayed over the boards which are to be etched. Water is pumped by means of a pump 38 from a container 36 via a conduit 37 to a perforated pipe 35 inside the washing chamber 34 and is sprayed over the boards which are to be washed. Fresh water is supplied via a conduit 39.

The used etching solution is pumped through a conduit 1 to a mixer-settler installation with a first extraction step 2, a second extraction step 3 and a re-extraction step 4.

In the first extraction step, the bath is contacted with an organic solution supplied by a conduit 5. The obtained raffinate passes a sedimentation step 7 for the separation of non-separated organic droplets, after which it is passed through a filter a with activated carbon, before it is stored in a buffer tank 9. The regenerated solution 10 is recirculated to the etching process. In the second extraction step 3, the organic extraction solution which is supplied from the mixer-settler 2 via a conduit 11 is contacted with washing water supplied from the container 36 via a conduit 12.

The organic solution is supplied from the mixer-settler 3 via a conduit 14. The washing water is supplied from said mixer-settler 3 via a conduit 13. Sodium hydroxide is added to the washing water via a conduit 15, and the obtained alkaline water is passed into a container 16 including a vertical pipe 44. This pipe 44 has open ends at the top and the bottom and contains a heating element 45, by means of which the water in the pipe is made to boil. The pipe 44 is provided with a branch pipe 46, which extends into a sedimentation container 17. Ammonia is expelled from the boiling water in the pipe 44, which results in precipitation of copper hydroxide. The boiling results in a raised water level in the pipe 44, which makes water flow over into the sedimentation container 17 via the branch pipe 46. The precipitated copper hydroxide forms a layer 47 at the bottom of the sedimentation container 17. Water can flow out of the sedimentation container 17 via a conduit 18.

The organic solution which is fed to the mixer-settler 4 in question through the conduit 14 is contacted with a solution of sulphuric acid, which is supplied via a conduit 19. The acid solution is withdrawn via a conduit 20.

The organic solution from the re-extraction is recirculated via the conduit 5 to the step for extraction of copper.

The solution of sulphuric acid is passed via the conduit 20 to a flotation tank 21 containing a filter 22 (activated carbon). Droplets of organic solution which have been separated from the water-based liquid form a surface layer 42. The last rests of organic liquid are removed in the filter 22. The solution is passed via a conduit 40 to a storage or buffer tank 23.

From this tank 23, a part of the copper-containing acid solution obtained from the re-extraction step is pumped through the conduits 24 and 25 to an electrolytic cell 26, in which copper is recovered electrolytically on titanium cathodes 41. The electrolyte 27 is recirculated to the tank 23. A part of the solution which is pumped through the conduit 24 is recirculated via a conduit 19 to the re-extraction step 4.

A second part of the solution from the tank 23 is pumped by means of the pump 101 via the conduit 107 as well as via a particle filter 102 and a charcoal filter 103 to a plating cell 112. 111 represents the acid which is used for the plating, whereas 110 represents a pump for circulation of the acid used for the plating.

The plating cell 112 is controlled by a rectifier 109 with pulsation and pole reversal. From the plating cell 112, the used acid solution is pumped via a pump 104, which is controlled by the level during the plating, and through the conduit 108 back to the storage tank 23. While being pumped, the solution passes a particle filter 105 and a charcoal filter 106.

As a rule, the copper content of the plating circuit is sensed and electrolyte from the electrolysis circuit is dosed to the plating as said copper content falls below a predetermined value.

The alternative embodiment of the mixer-settler installation 2–4 in FIG. 1, which is shown in FIG. 2 and in which the reference numerals that are common to those of the installation shown in FIG. 1 have been maintained, comprises as an additional step a separate step 3A for washing with water, so that in the flow which is subsequently diverted for plating, the amount of substances or material originating from the etch bath and possibly also the extraction will be reduced. Otherwise, this mixer-settler device is intended to function as the device shown in FIG. 1.

EXAMPLE

In an installation of the type shown in FIG. 1, a series of tests was carried out according to the specifications stated in appended Tables 1–3.

Cells were filled with acid from a recovery installation of the shown type. In the plating cell, two anodes with the dimensions 150×150 mm were suspended. Between the anodes, a plate was positioned according to the panel specification in the test results. The size of the plate was 100×100 mm and the number of holes was 10 per plate. The distance between anode and cathode was 100 mm.

Subsequently, the circulation of acid and the intake of air started. The intake of air is intended to agitate the bath but this is not always necessary. The rectifier was activated and run with the settings stated in the Tables. After 10 min, the rectifier was deactivated and the panels were removed and rinsed with water.

The panels were sawn at the centre of the holes and the sawn edge was ground so that it would possible to measure in a microscope the coating in the holes in relation to the coating on the surface. A part of the panel was used for a bending test to determine the possible maximum degree of strain of the panels.

The pulsation curves show the periods of time and the amounts of current used for coating and dissolution, respectively.

As regards the obtained results, it is in particular to be noted that the measured strain values (at least about 40% is extremely good, since it is normally necessary to obtain a strain of printed boards of at least 15–20% and on special occasions about 25–30%). Another requirement is a satisfactory coating in holes, in which case a ratio of 1:1 is desired for the relation hole:surface, which value has previously often been difficult to attain or at least required large and expensive additions of various additives in the plating. Our tests show that we can reach a value of 3:1 and never less than 1:1.

Another qualitative advantage due to the omission of additives or chemicals in the plating is that there will be no such impurities in used copper, which has a favourable effect on the conductivity of copper.

Yet another qualitative advantage is that it is very easy to adjust the process to different types of printed boards by modifying the settings of the rectifier. This is not possible when using chemicals, since in that case large volumes of liquid have to be adjusted.

TABLE 1

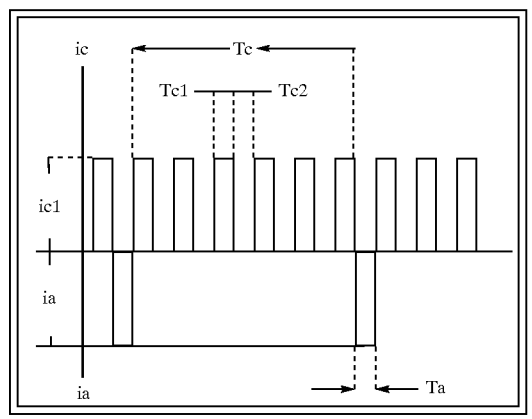

| Chemical specification | | | | | |
|---|---|---|---|---|---|
| Copper content | Acid content | Chloride content | Temperature | Air flow | Circulation |
| 20.5 g/l | 145 g/l | 40 ppm | 23 degr. C. | 25 l/min | 300 l/h |

| Panel specification | | | |
|---|---|---|---|
| Thickness | Base copper | Chem. copper | Hole diameter |
| 1.6 mm | 17 microns | 6 microns | 0.8 mm |

| Electric specification | | | | | |
|---|---|---|---|---|---|
| Panel No. | ic (A/dm2) | ia (A/dm2) | Tc (sec) | Tc1 (msec) | Tc2 (msec) | Ta (sec) |
| 1 | 3 | 4.5 | 60 | 20 | 20 | 8 |
| 2 | 3 | 4.5 | 20 | 20 | 20 | 8 |
| 3 | 3 | 4.5 | 20 | 40 | 40 | 8 |
| 4 | 2 | 3 | 60 | 20 | 20 | 8 |
| 5 | 2 | 3 | 20 | 20 | 20 | 8 |
| 6 | 2 | 3 | 20 | 40 | 40 | 8 |

| Results | | | | |
|---|---|---|---|---|
| Panel No. | Qa/Qc | Hole-Surface ratio | Tc + Ta | Strain | Remarks |
| 1 | 0.2 | 1.0 | 68 | 41 | |
| 2 | 0.6 | 1.4 | 28 | 40 | |
| 3 | 0.6 | 1.5 | 28 | 44 | |
| 4 | 0.2 | 1.0 | 68 | 42 | |
| 5 | 0.6 | 1.8 | 28 | 42 | |
| 6 | 0.6 | 1.7 | 28 | 46 | |

TABLE 2

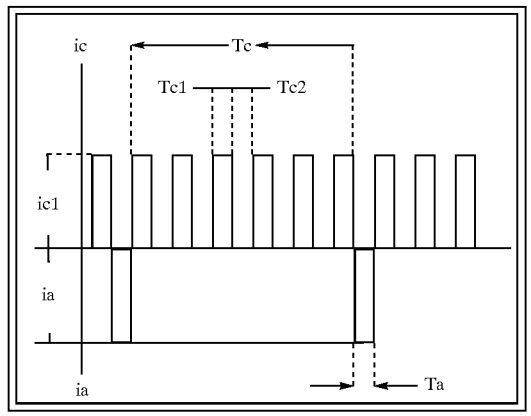

Chemical specification

| Copper content | Acid content | Chloride content | Temperature | Air flow | Circulation |
|---|---|---|---|---|---|
| 20.5 g/l | 145 g/l | 40 ppm | 23 degr. C. | 25 l/min | 300 l/h |

Panel specification

| Thickness | Base copper | Chem. copper | Hole diameter |
|---|---|---|---|
| 1.6 mm | 17 microns | 6 microns | 0.4 mm |

Electric specification

| Panel No. | ic (A/dm2) | ia (A/dm2) | Tc (sec) | Tc1 (msec) | Tc2 (msec) | Ta (sec) |
|---|---|---|---|---|---|---|
| 1 | 3 | 4.5 | 60 | 20 | 20 | 8 |
| 2 | 3 | 4.5 | 20 | 20 | 20 | 8 |
| 3 | 3 | 4.5 | 20 | 40 | 40 | 8 |
| 4 | 2 | 3 | 60 | 20 | 20 | 8 |
| 5 | 2 | 3 | 20 | 20 | 20 | 8 |
| 6 | 2 | 3 | 20 | 40 | 40 | 8 |

Results

| Panel No. | Qa/Qc | Hole-Surface ratio | Tc + Ta | Strain | Remarks |
|---|---|---|---|---|---|
| 1 | 0.2 | 1.3 | 68 | 40 | |
| 2 | 0.6 | 2.6 | 28 | 40 | |
| 3 | 0.6 | 2.7 | 28 | 43 | |
| 4 | 0.2 | 1.5 | 68 | 42 | |
| 5 | 0.6 | 3.0 | 28 | 41 | |
| 6 | 0.6 | 2.8 | 28 | 47 | |

TABLE 3

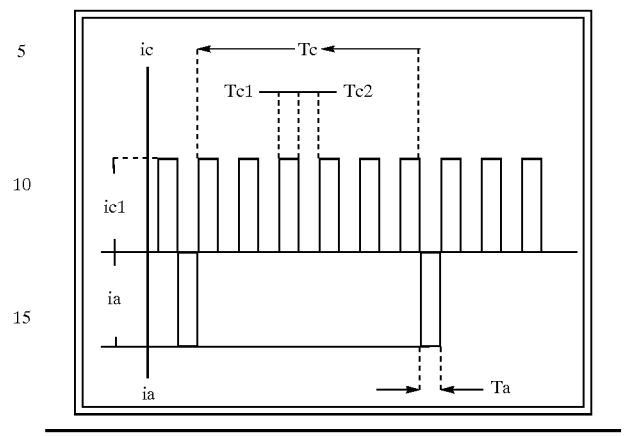

Chemical specification

| Copper content | Acid content | Chloride content | Temperature | Air flow | Circulation |
|---|---|---|---|---|---|
| 22.5 g/l | 140 g/l | 40 ppm | 23 degr. C. | 25 l/min | 300 l/h |

Panel specification

| Thickness | Base copper | Chem. copper | Hole diameter |
|---|---|---|---|
| 1.6 mm | 17 microns | 6 microns | 0.8 mm |

Electric specification

| Panel No. | ic (A/dm2) | ia (A/dm2) | Tc (sec) | Tc1 (msec) | Tc2 (msec) | Ta (sec) |
|---|---|---|---|---|---|---|
| 1 | 3 | 4.5 | 60 | 20 | 20 | 8 |
| 2 | 3 | 4.5 | 20 | 20 | 20 | 8 |
| 3 | 3 | 4.5 | 20 | 40 | 40 | 8 |
| 4 | 2 | 3 | 60 | 20 | 20 | 8 |
| 5 | 2 | 3 | 20 | 20 | 20 | 8 |
| 6 | 2 | 3 | 20 | 40 | 40 | 8 |

Results

| Panel No. | Qa/Qc | Hole-Surface ratio | Tc + Ta | Strain | Remarks |
|---|---|---|---|---|---|
| 1 | 0.2 | 0.9 | 68 | 39 | |
| 2 | 0.6 | 1.4 | 28 | 39 | |
| 3 | 0.6 | 1.4 | 28 | 42 | |
| 4 | 0.2 | 1.1 | 68 | 40 | |
| 5 | 0.6 | 1.8 | 28 | 41 | |
| 6 | 0.6 | 1.6 | 28 | 43 | |

What is claimed is:

1. A process for recovering copper from an alkaline etch bath from an etching process in which printed boards electroplated with copper are etched with the alkaline etch bath and then rinsed with water, comprising the steps of removing the copper from the alkaline etch bath by:

extracting the alkaline etch bath with an organic solution containing a reagent, which forms with copper a complex compound, which is extracted by the organic solution, recirculating the alkaline etch bath to renewed etching, contacting the copper-containing organic solution in a re-extraction step with an aqueous solution of an acid so that copper passes from the organic solution to the aqueous solution to form a copper-containing solution, recirculating the organic solution from the re-extraction step to renewed extraction, passing the copper-containing acid solution obtained from the re-extraction step to a copper recovery operation, diverting a flow from the copper-containing acid solution before the operation for recovering copper from the copper-containing acid solution, adjusting the copper content of said flow so that it will be lower than the copper content of the acid solution which is used in the copper recovery operation, and recirculating said flow having an adjusted copper content to the operation for electroplating printed boards for use therein.

2. A The process as claimed in claim 1, wherein copper is also removed from the rinsing water from the etching process by extraction with an organic solution containing a reagent, which forms with copper a complex compound which is extracted by the organic solution.

3. The process as claimed in claim 2, further comprises using the same organic solution for the rinsing water as for the alkaline etch bath, first removing copper from the alkaline etch bath, then contacting the thus obtained copper-containing organic solution with the rinsing water, and subsequently subjecting the organic solution to said re-extraction.

4. The process as claimed in claim 1, further comprising using the same organic solution for the rinsing water as for the alkaline etch bath, first removing copper from the rinsing water, then contacting the thus obtained copper-containing organic solution with the alkaline etch bath and, subsequently subjecting the organic solution to said re-extraction.

5. The process as claimed in claim 1, further comprising carrying out said process in a closed circuit, in which the electroplated printed board is etched with said alkaline etch bath and the acid solution from the electroplating is used for said re-extraction step.

6. The process as claimed in claim 1, further comprising adjusting the copper content so that the ratio of copper content of flow:copper content of said acid solution is >0.3:1.

7. The process as claimed in claim 6, further comprising adjusting the copper content so that said ratio is in the range of 0.60:1–0.95:1.

8. The process as claimed in claim 1, further comprising carrying out the electroplating in the form of pulse plating with wave-shaped pulses of current intensity.

9. The process as claimed in claim 1, further comprising carrying out the electroplating in the form of pulse plating with pole reversal.

10. The process as claimed in claim 8, further comprising carrying out the pulse plating with a pulse length of the wave-shaped pulses in the range of 1–500 ms.

11. The process as claimed in claim 8, further comprising adjusting the period of time during which the printed board acts as cathode in the pulse plating to a value in the range of 1–200 s.

12. The process as claimed in claim 8, further comprising adjusting the period of time during which the printed board acts as anode in the pulse plating to a value in the range of 0.1–20 s.

13. The process as claimed in claim 8, wherein the maximum current intensity during the period of time when the printed board acts as cathode in the pulse plating is 10 A/dm$^2$.

14. The process as claimed in claim 8, wherein the maximum current intensity during the period of time when the printed board acts as anode in the pulse plating is 40 A/dm$^2$.

15. The process as claimed in claim 1, further comprising adjusting the copper content of the flow which is recirculated to the electroplating by the addition of acid from the re-extraction step.

16. The process as claimed in claim 1, further comprising adjusting the copper content of the flow which is recirculated to the e plating to a value in the range of 5–100 g/l.

17. The process as claimed in claim 16, further comprising adjusting said copper content to a value in the range of 15–30 g/l.

18. The process as claimed in claim 1, adjusting the content of anion from the used acid to a value in the range of 25–250 g/l in the flow which is used in the electroplating.

19. The process as claimed in claim 1, wherein the content of anion from the used acid is substantially the same in the copper recovery operation as in the electroplating operation.

20. The process as claimed in claim 8, further comprising carrying out the pulse plating without any additives of the kind which is used in non-pulse plating of printed boards.

21. The process as claimed in claim 1, further comprising reducing any content of alkaline substance originating from the etch bath and/or reducing any content of organic material originating from the extraction in the flow which is recirculated to the electroplating before subjecting the same to said electroplating.

22. The process as claimed in claim 21, further comprising carrying out said reductions by means of one or more separate water washing steps in connection with the equipment which is used for the extraction.

23. The process as claimed in claim 21, further comprising carrying out said reductions by means of one or more filters and/or ultrafilters.

24. The process as claimed in claim 1, further comprising removing a colloidal copper before the electroplating from the flow which is recirculated to the electroplating.

25. The process as claimed in claim 1, further comprising using as equipment for said extraction one or more extractors in which the separation takes place by means of energy supplied from the outside.

26. The process according to claim 1, wherein said alkaline etch bath is an ammoniacal etch bath.

27. The process according to claim 1, wherein said acid of said aqueous solution of an acid is sulphuric acid.

28. The process as claimed in claim 1, further comprising adjusting the copper content so that the ratio of copper content of said flow:copper content of said acid solution is >0.5:1.

29. The process as claimed in claim 7, further comprising adjusting the copper content so that said ratio is in the range of 0.75:1–0.95:1.

30. The process as claimed in claim 1, further comprising carrying out the electroplating in the form of pulse plating with square pulses of current intensity.

31. The process as claimed in claim 8, further comprising in carrying out the pulse plating with a pulse length of the wave-shaped pulses in the range of 10–50 ms.

32. The process as claimed in claim 8, further comprising adjusting the period of time during which the printed board acts as cathode in the pulse plating to a value in the range of 10–100 s.

33. The process as claimed in claim 8, further comprising adjusting the period of time during which the printed board acts as anode in the pulse plating to a value in the range of 1–10 s.

34. The process as claimed in claim 8, wherein the maximum current intensity during the period of time when the printed board acts as cathode in the pulse plating is 5 A/dm$^2$.

35. The process as claimed in claim 8, wherein the maximum current intensity during the period of time when the printed board acts as cathode in the pulse plating is 3 $A/dm^2$.

36. The process as claimed in claim 8, wherein the maximum current intensity during the period of time when the printed board acts as anode in the pulse plating is 10 $A/dm^2$.

37. The process as claimed in claim 8, wherein the maximum current intensity during the period of time when the printed board acts as anode in the pulse plating is 5 $A/dm^2$.

38. The process as claimed in claim 1, further comprising adjusting the copper content of the flow which is recirculated to the electroplating to a value in the range of 10–50 g/l.

39. The process as claimed in claim 16, further comprising adjusting said copper content to a value in the range of 20–25 g/l.

40. The process as claimed in claim 1, further comprising adjusting the content of anion from the used acid to a value in the range of 50–200 g/l in the flow which is used in the electroplating.

41. The process as claimed in claim 21, further comprising carrying out said reductions by means of one or more charcoal filters and/or ultrafilters.

42. The process as claimed in claim 22, further comprising carrying out said reductions by means of one or more filters and/or ultrafilters.

43. The process as claimed in claim 1, further comprising removing any colloidal copper before the electroplating by means of one or more ultrafilters from the flow which is recirculated to the electroplating.

* * * * *